United States Patent
Pal et al.

(10) Patent No.: US 6,598,079 B1
(45) Date of Patent: *Jul. 22, 2003

(54) PLEDGE-BASED RESOURCE ALLOCATION SYSTEM

(75) Inventors: Shankar Pal, Redmond, WA (US); John G. Bennett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/932,928

(22) Filed: Aug. 21, 2001

Related U.S. Application Data

(63) Continuation of application No. 08/827,827, filed on Apr. 11, 1997, now Pat. No. 6,301,616.

(51) Int. Cl.[7] .............................................. G06F 13/00

(52) U.S. Cl. ........................ 709/226; 709/203; 709/104

(58) Field of Search ................................ 709/226, 203, 709/104, 102

(56) References Cited

U.S. PATENT DOCUMENTS

| | | | | |
|---|---|---|---|---|
| 5,179,556 A | * | 1/1993 | Turner ......................... | 370/233 |
| 5,265,250 A | * | 11/1993 | Andrade et al. ............ | 709/101 |
| 5,461,611 A | * | 10/1995 | Drake, Jr. et al. .......... | 370/420 |
| 5,522,070 A | * | 5/1996 | Sumimoto ................... | 709/104 |
| 5,600,822 A | * | 2/1997 | Grice et al. .................... | 712/16 |
| 5,745,694 A | * | 4/1998 | Egawa et al. ................ | 709/225 |
| 5,918,049 A | * | 6/1999 | Syvaniemi ................... | 709/104 |
| 5,963,945 A | * | 10/1999 | Pal ................................ | 707/10 |
| 6,205,484 B1 | * | 3/2001 | Eriksson ..................... | 709/229 |
| 6,301,616 B1 | * | 10/2001 | Pal et al. ..................... | 709/226 |
| 6,336,127 B1 | * | 1/2002 | Kurtzberg et al. .......... | 709/104 |

OTHER PUBLICATIONS

Silberschatz, Abraham and Peter B. Galvin, *Operating System Concepts*, 4th Ed. Addison–Wesley, Reading, MA., 1994,pp. 315–325.

Ullman, Jeffrey D., "Principles of Database Systems," 2nd Ed., Computer Science Press, 1982, pp. 58–69.

Ammann, P., F. Jaeckle and S. Jajodia, "A" Two–Snapshot Algorithm for Concurrency Control in Secure Multi–level Databases, In the Proceedings of the 1992 Symposium on Research in Security and Privacy, Oakland, CA, May 1992, pp. 204–215.

Pal, Shankar, "A Locking Protocol for Multilevel Secure Databases Providing Support for Long Transactions," In the Proceedings of the IFIP WG11.3 Ninth Annual Conference on Database Security, Rensselaerville, NY, Aug. 13–16, 1995, pp. 199–221.

* cited by examiner

*Primary Examiner*—Kenneth R. Coulter
(74) *Attorney, Agent, or Firm*—Woodcock Washburn LLP

(57) ABSTRACT

A pledge-based resource allocation system is provided in a client/server environment. In this system, resources, such as database objects, are allocated to clients for a limited time period. Allocating resources to clients for a limited time period ensures that a client cannot allocate a resource for so long as to affect other client's use of the resource. This limited use of resources also has other benefits, such as preventing concurrency problems like deadlock. Additionally, using this scheme, a client knows for how long it can utilize a resource since it knows for how long the resource will be valid (i.e., how long it integrity can be guaranteed) and can plan accordingly. Another aspect of the pledge-based resource allocation system is that it efficiently stores a directory structure containing allocation-related information for all resources in the system. This aspect provides that when accessing resource information, all related information of related resources are grouped closely together (i.e., partitioned) to facilitate their access and reduce memory access time.

8 Claims, 9 Drawing Sheets

| Timer Table | | |
|---|---|---|
| Partition | Subtree | Expiration Time |
| 1 | 57 | 7:03:10 |
| 2 | 1001 | 7:15:15 |
| 3 | 2023 | 7:07:30 |

*Fig. 7*

PLEDGE-BASED RESOURCE ALLOCATION SYSTEM

CROSS REFERENCE TO RELATED APPLICATIONS

This application is a continuation of and claims priority to U.S. application Ser. No. 08/827,827, now U.S. Pat. No. 6,301,616, entitled "Pledge-Based Resource Allocation System", filed on Apr. 11, 1997, which is hereby incorporated by reference.

TECHNICAL FIELD

The present invention relates generally to data processing systems and, more particularly, to a pledge-based resource allocation system.

BACKGROUND OF THE INVENTION

Conventional systems like the one depicted in FIG. 1 have been developed where a computer program 101 (a client) on a client computer 102 requests the allocation of a resource, such as a file, stored on a server computer 104 that is communicatively linked to the client computer via a network 106. After allocating the resource, the client 101 utilizes the resource and then indicates to the server computer 104 that it has completed its use of the resource and that the server computer may deallocate the resource. The deallocation of the resource on the server computer 104 is performed in response to the client 101 indicating that it is finished with the resource.

A number of problems can arise in the conventional system 100 depicted in FIG. 1. For example, if the client computer 102 is connected to the server computer 104 via a rather untrustworthy network 106, the resource may never be deallocated by the client and thus the resource cannot be used by other clients. Additionally, the client may forget about the use of the resource (e.g., due to an error) and again the resource is continually allocated and unavailable to other clients. Managing these problems becomes much more complex as the number of resources that the server computer 104 can allocate becomes very large and the number of clients who can use the resources also becomes very large. In this situation, the server computer 104 spends a significant amount of processing time maintaining numerous data structures containing information about thousands or even millions of resources. It is therefore desirable to improve resource allocation strategies to suit the needs of a client/server environment where the server computer has many resources that can be allocated to many clients.

SUMMARY OF THE INVENTION

A pledge-based resource allocation system for a client/server environment is provided. In this system, resources, such as database objects, are allocated to clients for a limited time period. Allocating resources to clients for a limited time period ensures that a client cannot allocate a resource for so long as to affect other client's use of the resource. This limited use of resources also has other benefits, such as preventing concurrency problems like deadlock. Additionally, using this system, a client knows for how long it can utilize a resource since it knows for how long the resource will be valid (i.e., how long its integrity can be guaranteed) and can plan accordingly.

Another aspect of the pledge-based resource allocation system is that it efficiently stores a directory structure containing allocation-related information for all resources in the system. This aspect provides that when accessing resource information, all related information of related resources are grouped closely together (i.e., partitioned) to facilitate their access and reduce memory access time.

In accordance with a first aspect of the present invention, a method is practiced in a computer system for allocating groups of resources of the computer system to a client. The method assigns a first expiration time to each group, receives a request from the client to allocate one of the resources in one of the groups, and allocates the one resource to the client. Further, the method determines when the first expiration time of the one group has been reached, and when it is determined that the first expiration time has been reached, the method assigns a second expiration time to the one group. The method also determines when the second expiration time has been reached, and when it is determined that the second expiration time has been reached, the method deallocates the one resource from the client.

In accordance with a second aspect of the present invention, a method is practiced in a computer system for allocating objects to a client where the computer system has a B+tree data structure with an entry for each object. The entries store allocation information for the objects. The method groups related objects into groups, assigns an expiration time to each group, and receives a request from the client to allocate one of the objects in one of the groups. Further, the method stores an indication of the client into the entry in the B+tree for the one object to allocate the one object to the client, and determines when the expiration time has been reached after the allocation of the one resource. When it is determined that the expiration time has been reached, the method deletes the indication of the client to deallocate the object.

In accordance with a third aspect of the present invention, a data processing system is provided comprising a client computer, a server computer, and a network communicatively linking the server computer to the client computer. The client computer has a memory containing a computer program that requests allocation of a resource, that receives a time limit for using the resource, and that utilizes the resource until the time limit has been reached. The client computer also has a processor for running the computer program. The server computer has a memory containing a resource allocator for allocating resources of the server computer to the computer program and contains a B+tree having subtrees for storing allocation information for partitions of the resources. The server computer also has a processor for running the object allocator. Each partition has an associated expiration time. The subtrees are stored in a contiguous block of the memory. The resource allocator receives an allocation request for a resource from the computer program, calculates the time limit by adding a predetermined time interval to the expiration time, stores an indication of the computer program into the B+tree and sends the time limit to the computer program to allocate the resource, determines when the expiration time expires for a second time, and deallocates the allocated resource when it is determined that the time limit has expired.

BRIEF DESCRIPTION OF THE DRAWINGS

FIG. 7 depicts the timer table.

DETAILED DESCRIPTION OF THE INVENTION

Figure 1:
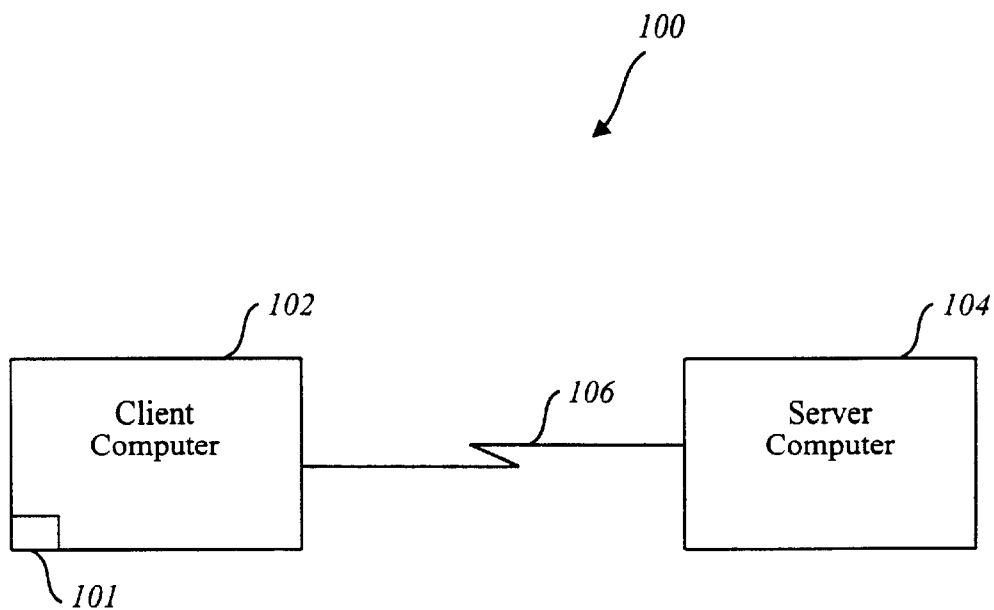
FIG. 1 depicts a conventional data processing system where a client on a client computer allocates a resource stored on a server computer.

A preferred embodiment of the present invention provides a pledge-based resource allocation system to a client/server environment. In this system, resources, such as database objects, are allocated to clients for a limited time period. Allocating resources to clients for a limited time period ensures that a client cannot allocate a resource for so long as to affect other clients' use of the resource. This limited use of resources also has other benefits, such as preventing concurrency problems like deadlock by preventing one client from permanently depriving another client of a resource. Additionally, using this scheme, a client knows for how long it can utilize a resource, since it knows for how long the resource will be valid (i.e., how long its integrity can be guaranteed), and can plan accordingly.

Another aspect of the present invention efficiently stores a directory structure containing allocation-related information for all resources in the system. This aspect provides that when accessing resource information, all related information of related resources are grouped closely together (i.e., clustered or partitioned) to facilitate their access and reduce memory access time.

The resources maintained by a preferred embodiment of the present invention are database objects, such as fields of a record, or records of a table. Although hereafter reference will be made to "objects," one skilled in the art will appreciate that the present invention can be used with other types of resources of a computer system, like files, units of memory, or units of data maintained by any of a computer system's storage devices, input devices or output devices.

The objects in the system are divided into partitions, which are groupings of objects selected by the numerical closeness of their object identifier (OID). Each object in the system is assigned an OID, which is a 128 bit number uniquely identifying the object. Objects are assigned OIDs such that related objects are clustered together (i.e., numerically close), which provides benefits as described below. Since the objects are divided into partitions by their OIDs, this technique ensures that related objects will be grouped into the same partition.

All objects in the system have a corresponding data record ("object record") in a directory structure. The object record contains an identification of all clients ("client IDs") that have currently allocated a particular object. The client IDs are stored in client entries in the object record. The directory structure is implemented as a B+tree data structure. Each partition of objects is stored as a subtree of the B+tree, and each subtree is stored in one contiguous block of memory. If the subtree does not fit into one contiguous block of memory, additional contiguous blocks may be allocated. The object records are referred to by the leaf nodes of the B+tree and are stored as groups of eight object records per block of memory. One skilled in the art will appreciate that other groupings of object records to blocks of memory can be used. Since the entries for related objects are stored in the same subtree in a contiguous block of memory and since groups of related object records are stored in a contiguous block of memory, the system provides the benefit of locality, where when an access is made of related object entries, the related entries are contiguous and memory access time is reduced.

Each partition has successive expiration times associated with it. When an expiration time is reached, garbage collection of the corresponding subtree in the directory structure occurs. During garbage collection, all client entries for all object records in the subtree are examined. In each client entry is an indication of whether the client has had the object allocated through the expiration of a previous expiration time. If the client had the object allocated through the expiration of a previous expiration time, the client entry is garbage collected (i.e., deallocated). After garbage collection occurs, the expiration time for the partition is extended by a predetermined time interval to create a new expiration time upon the reaching of which another garbage collection will occur.

As stated above, a particular object is deallocated from a client when the expiration time has been reached, a new expiration time has been set and the new expiration time has been reached, all while the object has been allocated to the same client. Deallocating an object from a client when the expiration time has been twice reached (or twice expired) ensures that the client has had the object allocated for at least one complete time interval and at most two time intervals. This technique is known as the "second chance algorithm." Whenever the subtree for a partition is accessed, the expiration time of the partition is checked against the current time to determine if garbage collection should occur. If it is determined that garbage collection should occur, each client entry in each object record is accessed to determine if the client ID in the client entry should be removed. Removal occurs only if the client has had the object allocated through the expiration of two consecutive expiration times.

Figure 2:
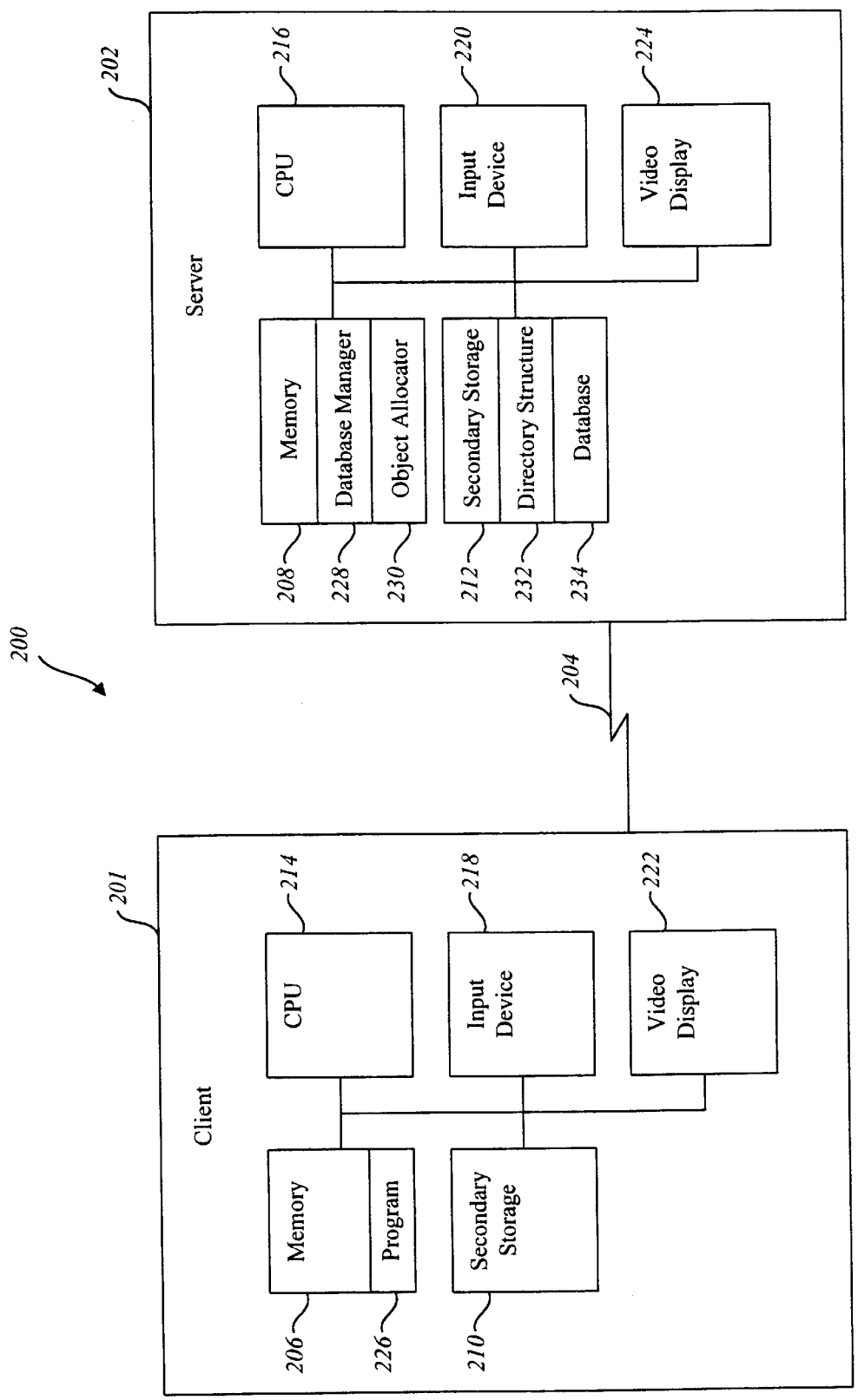
FIG. 2 depicts a data processing system that is suitable for practicing a preferred embodiment of the present invention.

FIG. 2 depicts a data processing system 200 that is suitable for practicing a preferred embodiment of the present invention. The data processing system 200 comprises a client computer 201 and a server computer 202 interconnected via a network 204. The client computer 201 and the server computer 202 contain similar components such as a memory 206, 208, a secondary storage device 210, 212, a central processing unit (CPU) 214, 216, an input device 218, 220, and a video display 222, 224. The memory 206 of the client computer 201 contains a computer program 226. The computer program 226 (i.e., a client) allocates a resource, such as a database object, from the server computer 202 and utilizes the resource until it is no longer valid (i.e., the object's integrity can no longer be guaranteed). The memory 208 of the server computer 202 contains a database manager 228 that manages a database 234 on the secondary storage device 212 and an object allocator 230 that is responsible for allocating objects in the database 234 and maintaining a directory structure 232 for the objects in the database 234. The directory structure 232 contains an object record for each object in the database 234 that is allocated to at least one client. Although the directory structure 232 is depicted as being stored on the secondary storage device 212, it should be appreciated that at runtime it is located in memory 208. Each object record contains an indication of all the clients that currently have the object allocated. The object allocator 230 is responsible for adding client entries to the directory structure 232 when objects are allocated and removing client entries from the directory structure when objects are deallocated. As stated above, deallocation occurs in response to the expiration of an expiration time. It is the object allocator's 230 responsibility to determine when such an expiration time has expired.

Figure 3:
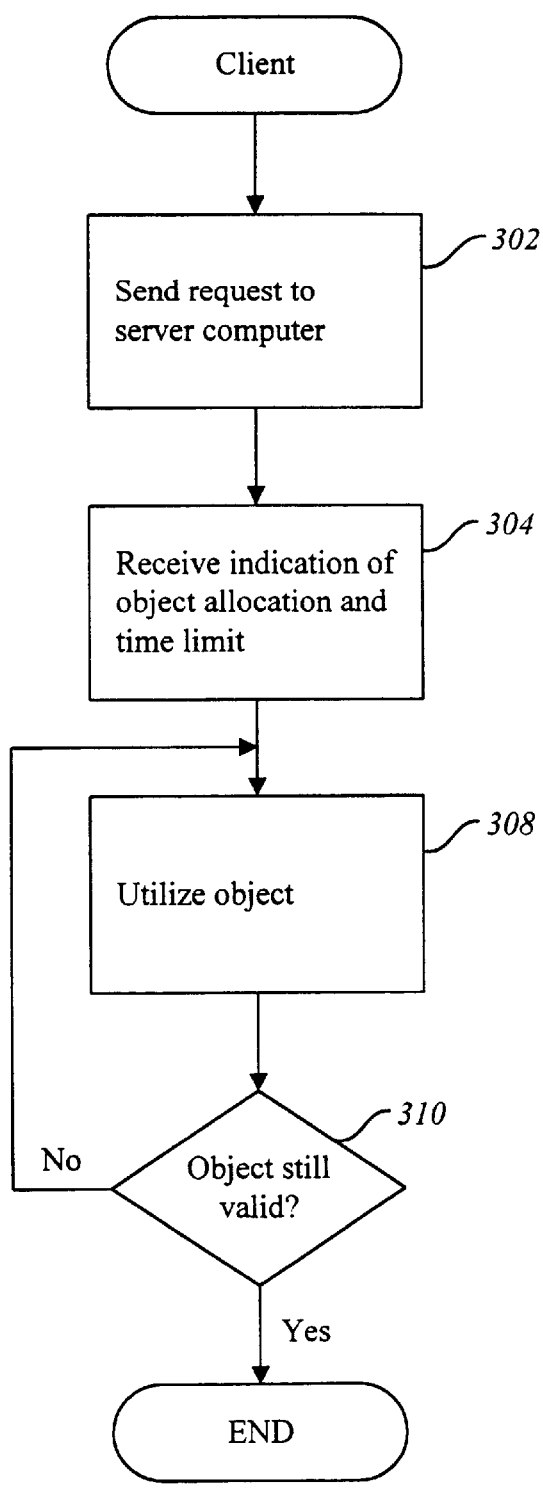
FIG. 3 depicts a flowchart of the steps performed by a client on the client computer of FIG. 2 when allocating an object.

FIG. 3 depicts a flowchart of the steps performed by the client (i.e., computer program 226) on the client computer 201 when allocating an object. In order to allocate an object, the client first sends a request to the object allocator on the server computer (step 302). In this step, the client sends an OID specifying the object to be allocated. After sending the request, the client receives an indication from the object allocator that the object has been allocated and also receives a time limit beyond which the object will no longer be valid (step 304). In this step, a preferred embodiment additionally sends a copy of the object to the client since a preferred embodiment stores all objects on the server computer. However, one skilled in the art will appreciate that the client computer may have already had a copy of the requested object or may have obtained it by other means. For example, a prefetching scheme may be used where the server computer sends a number of additional objects to the client computer when it sends a requested object. The time limit received by the client is calculated by the object allocator to be the expiration time currently associated with the partition containing the object plus the time interval for the partition. This time limit thus indicates the exact time upon which the object allocator will deallocate the object. After receiving the indication of the object allocation, the client utilizes the object (step 308) performing whatever processing necessary with the object and periodically determines if the object is still valid (step 310). The client determines if the object is valid by comparing the current time to the time limit. The client computer and the server computer maintain synchronized clocks so as to ensure the accuracy of the time limit. If the object is still valid, the client can utilize the object some more. However, if the object is no longer valid, the client knows that the validity of the object can no longer be guaranteed and therefore processing ends with respect to this object. At this point, the client may discard the object.

Figure 4:
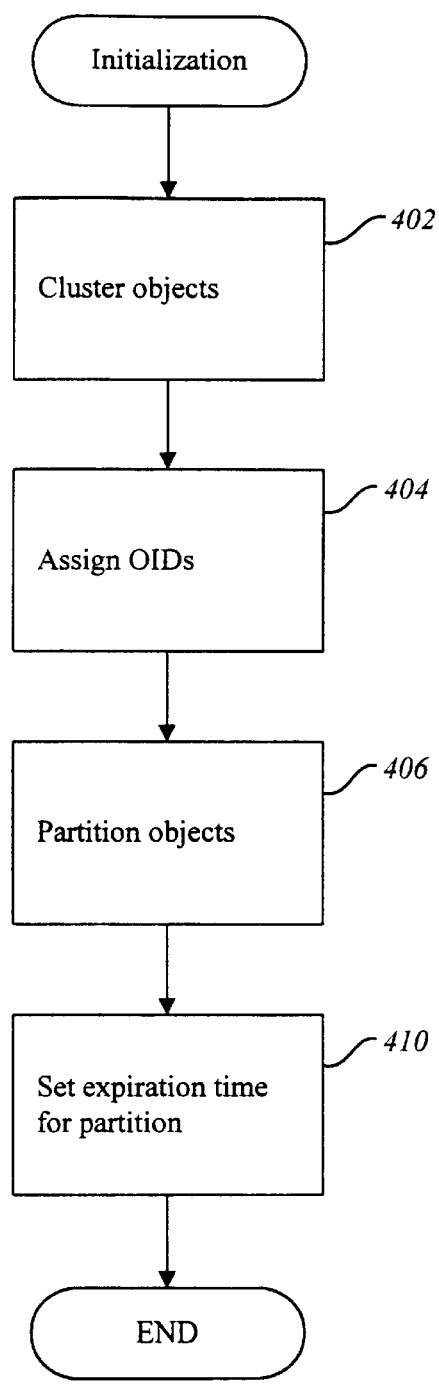
FIG. 4 depicts a flowchart of the steps performed by the object allocator of FIG. 2 when initializing the system.

FIG. 4 depicts a flowchart of the steps performed by the object allocator 230 during initialization of the system. At system startup time, the database has a certain number of database objects associated with it. The first step performed by the object allocator is to cluster the objects (step 402). In this step, the object allocator groups all of the related objects together. For example, all fields within a record are related and all records in a table are related. However, if a table becomes too large, the table may be partitioned into multiple disjoint groups. After dividing the objects into clusters or groups, the object allocator assigns OIDs to the objects (step 404). Each object is assigned an OID with groups of objects receiving sequential OIDs. After assigning OIDs to one group, a number of consecutive OIDs are skipped to allocate room for future growth and then the next group is numbered sequentially. Therefore, each group of objects has a range of OIDs and each group's range is nonoverlapping. That is, there is no OID in one group whose value is within the range of OID values of another group. After assigning OIDs to the objects, the objects are partitioned (step 406). In partitioning the objects, the object allocator uses a predetermined number and divides the objects into partitions based on this number. For example, the first one thousand objects may go into a first partition, the second thousand objects may go into a second partition, etc. One skilled in the art will appreciate that various other methods for partitioning the objects may be used. After partitioning the objects, the object allocator sets an expiration time for the partition (step 410). In this step, the object allocator has a preset time interval (e.g., 5 minutes) for each partition. This time interval fluctuates depending upon the system load. The system load refers to the number of object records stored in the directory structure. The fluctuation of the time interval is desirable so as to keep the percentage of garbage collection-related processing performed during the time interval relatively constant. That is, as the number of object records increases in a partition, the amount of time necessary to perform garbage collection increases and it may increase to the point where, during one time interval, only garbage collection-related processing is performed. To prevent this situation from happening, the system increases the time interval as the number of objects in a partition increases. For example, when a partition has a number of object records over a maximum number, the time interval can be increased from 5 to 7 minutes. Conversely, when the number of object records for a partition goes below a minimum number, the time interval can be decreased from 5 to 3 minutes.

To initially set the expiration time, the object allocator determines the current time and adds the time interval to the current time to determine the expiration time. This expiration time is then stored in a timer table 700 as shown in FIG. 7. The timer table 700 contains a column indicating the partition 702, a column indicating the compressed OID of the first object in the subtree for that partition 704, and the expiration time for the partition 706. For example, the OID of the first object in partition 1 is 57 and partition 1 has an expiration time of 7:03:10. After setting the expiration time for the partition, the system is ready for normal operations. It should be appreciated that during the normal operations of the system, objects can be created and deleted during which time the object records and nodes in the directory structure 500 are created and destroyed using conventional B+tree accessing methods.

Figure 5:
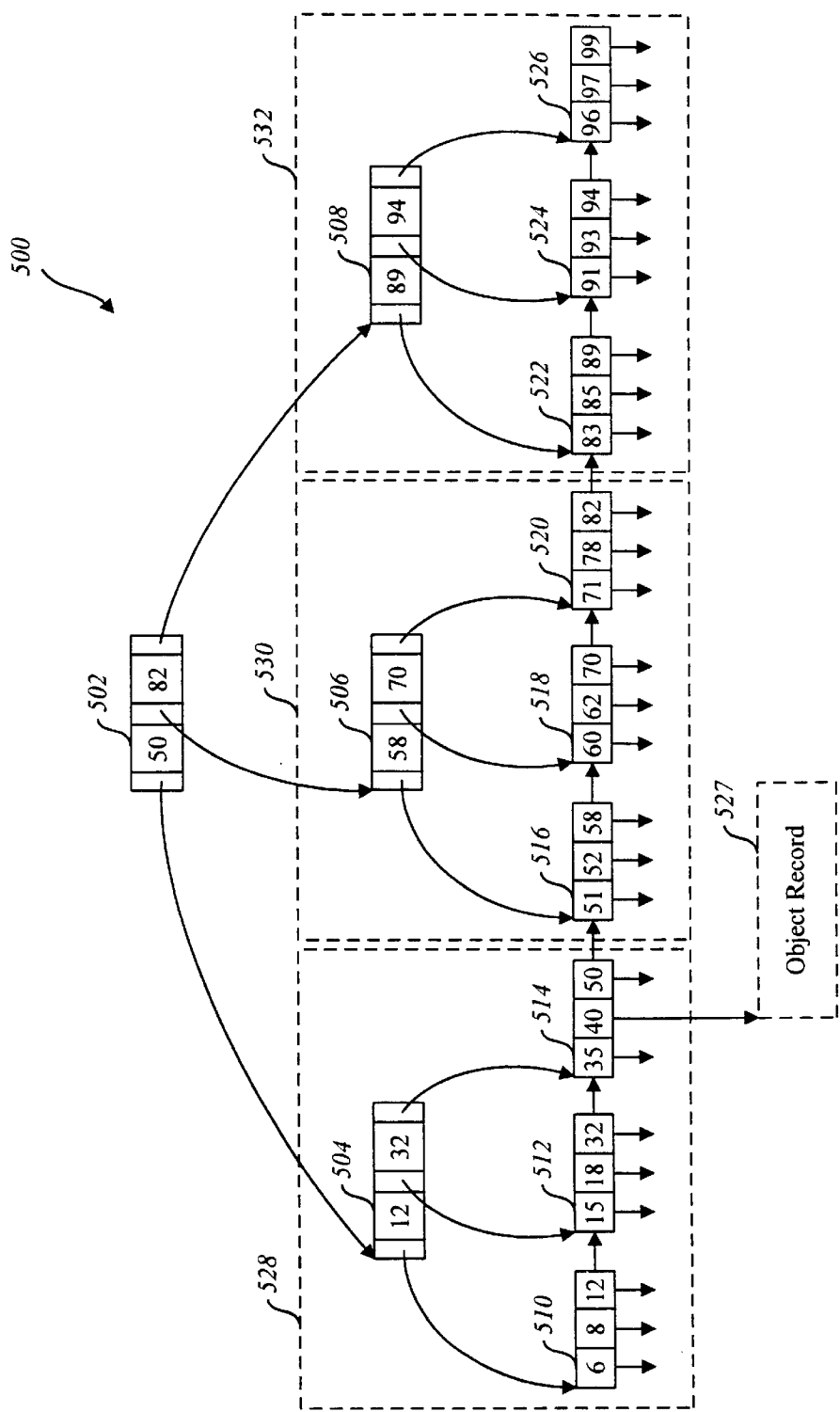
FIG. 5 depicts the directory structure of FIG. 2 in greater detail.

At runtime, allocation information for each partition of objects will be stored as a subtree in the directory structure 232. As previously stated, the directory structure 232 is implemented as a B+tree, an example of which is depicted in FIG. 5. The B+tree 500 is used for storing the directory structure. The B+tree 500 contains a root node 502, three intermediate nodes 504, 506, 508, and nine leaf nodes 510–526. The root node 502 contains a pointer to each intermediate node 504, 506, 508 and two key values "50" and "82." The key values in the B+tree 500 are compressed forms of an OID (e.g., the high order 8 bytes). Each intermediate node 504, 506, 508 contains one or more key values and two or more pointers to leaf nodes 510–526. Each leaf node 510–526 contains key values and pointers to an object record indexed by the key values. For example, the leaf node 514 contains a key value "40" and a pointer that refers to object record 527. Additionally, each leaf node (e.g., 510) contains a pointer to another leaf node (e.g., 512) to facilitate searches of the B tree. All the leaf nodes 510–526 are at the same depth in the B+tree. The B+tree 500 has three subtrees 528, 530 and 532, and each subtree 528, 530 and 532 is stored in one contiguous block of memory. However, if the subtree is larger than one block of memory, additional subtrees can be allocated. Groups of object records (e.g., 527) for a subtree are also stored in one contiguous block of memory, as will be further discussed below. The size of the B+tree 500 is merely exemplary, and one skilled in the art will appreciate that the B+tree used for the directory structure 232 may contain more nodes, more levels of nodes and more subtrees.

When accessing the B+tree 500 to obtain a particular object record, the key value of the particular object record is compared against the key values in the nodes of the B+tree. Each key value of the root node 502 indicates the highest indexed key value (OID) held in one of the subtrees 528, 530, 532. For example, root node 502 contains a key value "50" which is the highest indexed key value found in subtree 528. The key values in the intermediate nodes 504, 506, 508 indicate the highest indexed key value in one of the leaf nodes 510–526. For example, intermediate node 504 contains a key value "12" which is the highest key value in leaf node 510. By using the key values of the B+tree, searching for object records is facilitated. B+trees are described in further detail in Ullman, *Principles of Database Systems*, Second Edition, Computer Science Press Inc. (1982), at pp. 58–69.

Figure 6A:
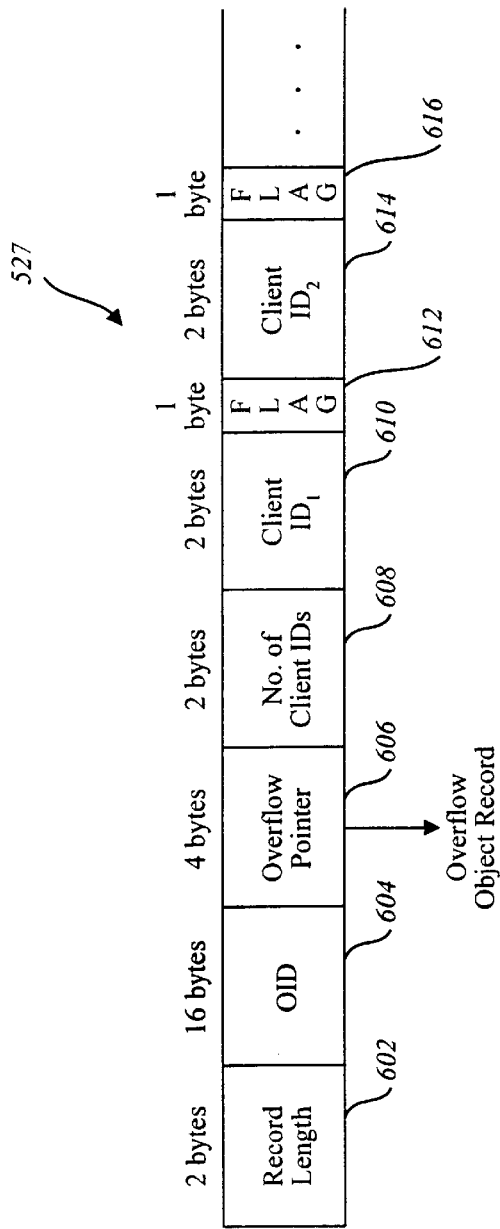
FIG. 6A depicts the object record of FIG. 5 in greater detail.
Figure 6B:
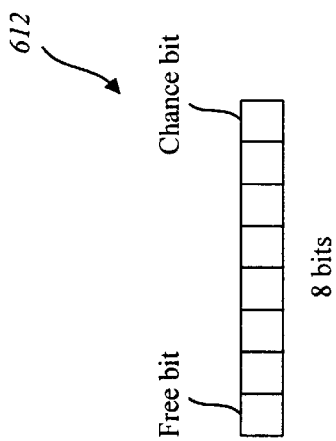
FIG. 6B depicts the flag of FIG. 6A in greater detail.

A more detailed diagram of object record 527 is depicted in FIG. 6A. The object record 527 is a maximum of 512 bytes in length and contains a number of fields. These fields include the record length field 602, which contains the length in bytes of the object record 527; the OID field 604, which contains the OID of the object; the overflow pointer field 606, which refers to another object record in the event that there are more clients allocated for the object than can fit into the object record 527; the number of client IDs field 608 which contains the number of client IDs in the object record; and a number of pairs of client IDs 610, 614 and flags 612, 616. Each client ID and flag pair is a client entry. The client ID is a unique identifier indicating a client that has allocated the object. The flag 612, 616, as shown in FIG. 6B, contains an indication (a "free bit") of whether this client entry is currently utilized or whether it is empty and an indication (a "chance bit") of whether the client has had the object allocated for a first time interval (a first chance) where the value is 0 or whether the client has had the object allocated for a second time interval (a second chance) where the value is 1.

Figure 8A:
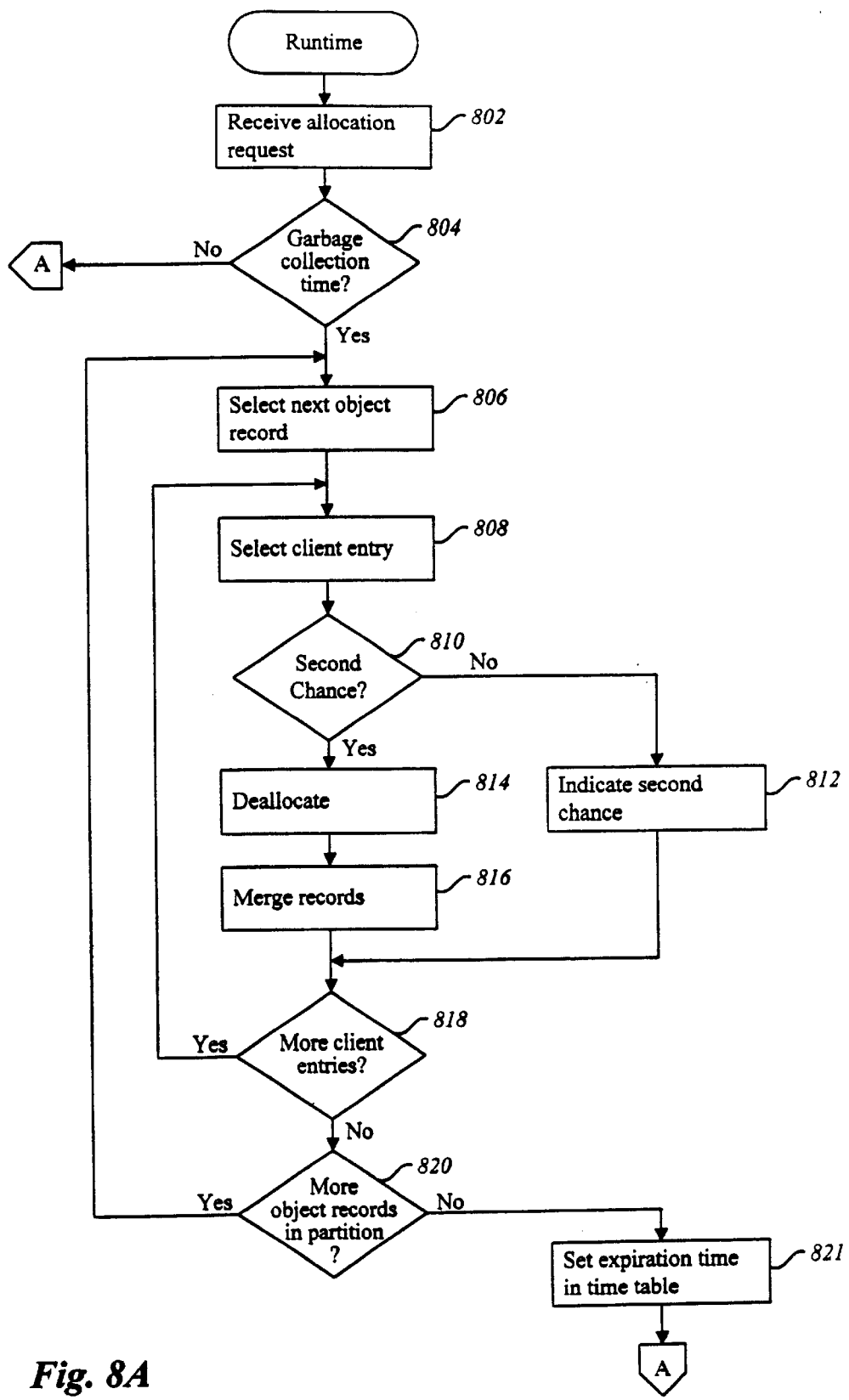
FIGS. 8A and 8B depict a flowchart of the steps performed by the object allocator when receiving an allocation request from a client.
Figure 8B:
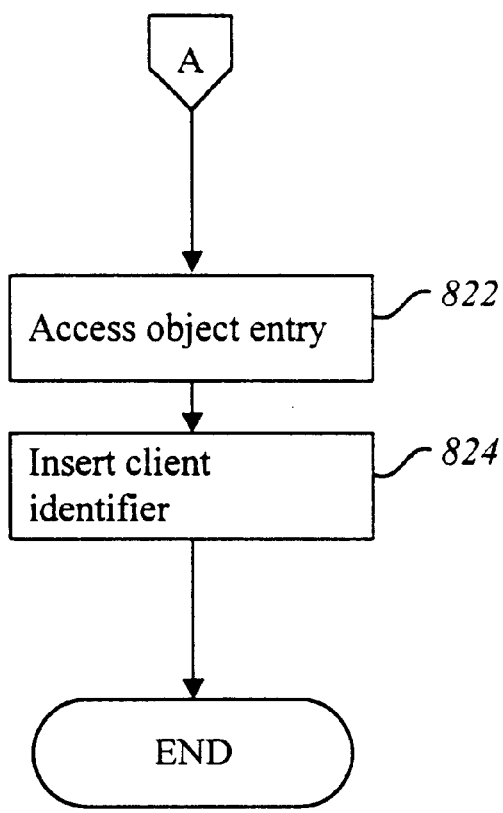

FIGS. 8A and 8B depict a flowchart of the steps performed by the object allocator 230 when it receives an allocation request from a client. The first step performed by the object allocator is to receive an allocation request (step 802). In this request, the OID of the requested object is provided. After receiving the allocation request, the object allocator determines if garbage collection should occur (step 804). In order to make this determination, the object allocator checks the current time against the expiration time in the timer table for the partition in which the requested object is contained. If the expiration time has not been reached, processing continues to step 822 in FIG. 8B. Otherwise, if the expiration time has been reached, garbage collection occurs as reflected by steps 806–821. One skilled in the art will appreciate that instead of checking the current time every time a partition is accessed, a timer may be used and upon its expiration, deallocation can be performed.

The first step of the garbage collection process is for the object allocator to select the next object record in the partition, starting with the first (step 806). The first object record can be accessed using the OID found in the timer table 700. After selecting the object record, the object allocator selects the next client entry, starting with the first (step 808). After selecting the client entry, the object allocator determines whether the client has had the object allocated for a second chance (step 810). As previously stated, there is a chance bit in the flag associated with each client indicating whether the client has had the object allocated for a second chance (second time interval). If the client has had the object allocated for a second chance, the object allocator deallocates the object from the client (step 814). Deallocation is performed by setting the free bit of the client entry to indicate that the client entry is unused. If the client entry deallocated is the only client entry in the object record, the object record is deleted. After deallocating the object, the object allocator merges an overflow object record into the object record if possible (step 816). Object records can be merged if there is at least one overflow object record allocated for the object record and there are fewer client entries in total than can be stored in the object record (i.e., there no longer is the need for an overflow object record). Additionally, overflow records can be merged. When merging an overflow object record with an object record, the client entries in the overflow object record are copied to the object record and the overflow object record is deallocated. If the client has not had the object allocated for a second chance, the object allocator sets the chance bit to indicate that the client has had the object allocated for a second chance (step 812).

After merging the overflow object record or after indicating that the client has had the object allocated for a second chance, the object allocator determines if there are more client entries for this object in either the object record or an overflow object record (step 818). If there are more client entries for this object, processing continues to step 808. However, if there are no more client entries, the object allocator determines if there are more object records in the partition (step 820). If there are more object records in the partition, processing continues to step 806 and another object record is selected. However, if there are no more object records in the partition, the object allocator sets the expiration time in the timer table by increasing its current value by the time interval. After setting the expiration time in the timer table, or if it is determined that garbage collection should not occur, processing continues to step 822 in FIG. 8B to allocate the object to the client. In allocating the object to the client, the object allocator accesses the object record (step 822) using the compressed OID. If no object record is located, an object record is created. Then, the object allocator inserts the client ID into the first unused client entry of the object record (step 824). When inserting the client ID, if the object record is full, the object allocator will allocate an overflow object record and insert the client ID into the overflow record. After inserting the client identifier into the object entry, processing ends.

While the present invention has been described with reference to a preferred embodiment thereof, those skilled in the art will appreciate that various changes in form and detail may be made without departing from the spirit and scope of the present invention as defined in the appended claims.

What is claimed is:

1. A computer-readable medium containing instructions for controlling a data processing system to allocate objects stored on a server computer to a client on a client computer, by the client computer performing:

sending, by the client computer, a request to the server computer to allocate an object;

receiving, by the client computer, an indication that the object has been allocated and a time limit;

determining when the time limit has been reached; and when it is determined that the time limit has been reached, identifying, by the client computer, the object as being deallocated responsive to the time limit being reached.

2. The computer readable medium of claim 1, wherein the server computer has a B+tree data structure storing allocation information for the objects, and wherein allocating the object includes storing an identifier of the client computer into the B+tree data structure to indicate the allocation.

3. A method in a data processing system for allocating objects stored on a server computer to a client on a client computer, the method performed by the client comprising:

sending, by the client computer, a request to the server computer to allocate an object;

receiving, by the client computer, an indication that the object has been allocated and a time limit;

determining, by the client computer, when the time limit has been reached; and when it is determined that the time limit has been reached, identifying, by the client computer, the object as being deallocated responsive to the time limit being reached.

4. The method of claim 3, wherein the server computer has a B+tree data structure storing allocation information for the objects, and wherein allocating the object includes storing an identifier of the client computer into the B+tree data structure to indicate the allocation.

5. A method in a computer system for allocating objects to clients, comprising:

dividing the objects into groups wherein each group contains related objects;

assigning identifiers to the objects of each group wherein the numerical identifiers for each group have a range and the range of each group is nonoverlapping;

associating a time value with each group;

allocating a plurality of the objects to the clients to create allocated objects;

detecting when one of the time values associated with one of the groups has been reached, the one group having an allocated object; and deallocating the allocated object in the one group.

6. A computer-readable medium containing instructions for controlling a computer system to allocate groups of objects to a client, the computer system having a B+tree data structure with an entry for each object, the entries storing allocation information for the objects, by performing:

assigning an expiration time to each group;

receiving a request from the client to allocate a selected one of the objects in a selected on one of the groups;

storing an indication of the client into the entry in the B+tree for the selected object to allocate the selected object to the client;

determining when the expiration time has been reached after the allocation of the selected object; and when it is determined that the expiration time has been reached, deleting the indication of the client to deallocate the object.

7. A method in a data processing system for allocating a resource on a server computer by a resource allocator to a client on a client computer, the method performed by the resource allocator comprising:

receiving, by the resource allocator on the server computer, a request from the client computer to allocate a resource;

allocating, by the resource allocator on the server computer, the resource for use by the client for a preset amount of time;

determining, by the resource allocator on the server computer, when the preset amount of time has expired; and deallocating, by the resource allocator on the server computer, the resource, when the preset amount of time has expired;

wherein the server computer has a B+tree data structure storing allocation information for the resource, and wherein allocating the resource includes storing an identifier of the client computer into the B+tree data structure to indicate the allocation.

8. A computer-readable medium containing instructions for controlling a data processing system to allocate a resource on a server computer by a resource allocator to a client on a client computer, by the resource allocator performing:

receiving, by the resource allocator on the server computer, a request from the client computer to allocate a resource;

allocating, by the resource allocator on the server computer, the resource for use by the client for a preset amount of time;

determining, by the resource allocator on the server computer, when the preset amount of time has expired; and deallocating, by the resource allocator on the server computer, the resource, when the preset amount of time has expired;

wherein the server computer has a B+tree data structure storing allocation information for the resource, and wherein allocating the resource includes storing an identifier of the client computer into the B+tree data structure to indicate the allocation.

* * * * *

UNITED STATES PATENT AND TRADEMARK OFFICE
CERTIFICATE OF CORRECTION

PATENT NO. : 6,598,079 B1  Page 1 of 1
DATED : July 22, 2003
INVENTOR(S) : Shankar Pal and John G. Bennett It is certified that error appears in the above-identified patent and that said Letters Patent is hereby corrected as shown below:

<u>Column 9,</u>
Line 43, delete "on" after "selected".

Signed and Sealed this

Twentieth Day of January, 2004

JON W. DUDAS
*Acting Director of the United States Patent and Trademark Office*